United States Patent [19]

Monfort et al.

[11] Patent Number: 4,803,374
[45] Date of Patent: Feb. 7, 1989

[54] CONTINUOUS MEASUREMENT OF THE SURFACE ROUGHNESS OF A COLD-ROLLED PRODUCT

[75] Inventors: Guy A. Monfort, Montegnee; Adolphe A. Bragard, Esneux, both of Belgium

[73] Assignee: Centre de Recherches Metallurgiques-Centrum Voor Research in De Metallurgie, Brussels, Belgium

[21] Appl. No.: 938,239

[22] Filed: Dec. 5, 1986

[30] Foreign Application Priority Data

Dec. 5, 1985 [LU] Luxembourg .............................. 86194

[51] Int. Cl.[4] .............................................. G01H 21/86
[52] U.S. Cl. .................................... 250/571; 356/371; 356/446
[58] Field of Search ................ 250/571, 572, 562–563; 356/359, 376, 360, 237, 371, 446

[56] References Cited

U.S. PATENT DOCUMENTS 4,498,771 2/1985 Makosch et al. .................... 356/359
4,629,319 12/1986 Clarke et al. ......................... 356/237
4,650,330 3/1987 Fujita .................................... 356/359

OTHER PUBLICATIONS

P. Beckmann and A. Spizzichino, "The Scattering of Electromagnetic Waves From Rough Surfaces," Pergamon Press, 1963, pp. 80–95.

Primary Examiner—Edward P. Westin
Assistant Examiner—Khaled Shami
Attorney, Agent, or Firm—Holman & Stern

[57] ABSTRACT

A light beam, e.g. from a laser, is transmitted onto the surface of a cold-rolled product such as steel strip. The light beam has a wavelength at least equal to the maximum roughness of the product surface. The reflected light energy is measured, preferably in the specular direction with respect to the incident beam; the surface roughness is deduced from that measurement. The light beam may be interrupted to provide two beams alternately incident on the same spot at different angles.

12 Claims, 3 Drawing Sheets

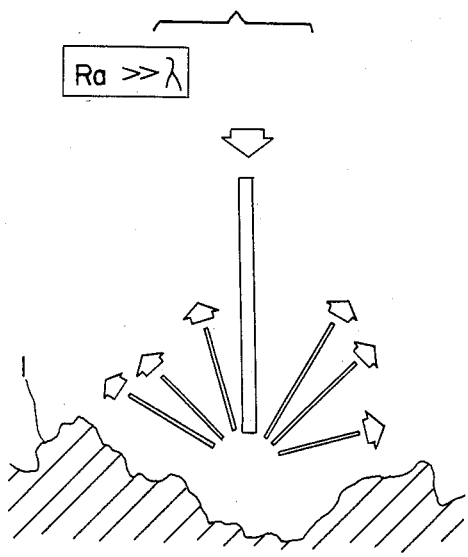
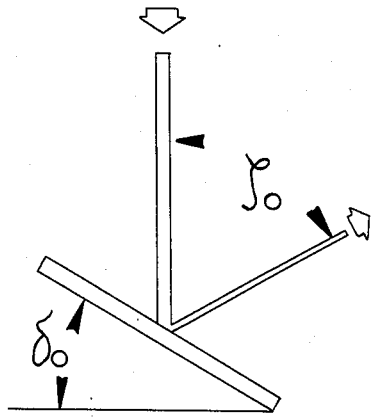
FIG. 1a    FIG. 1b
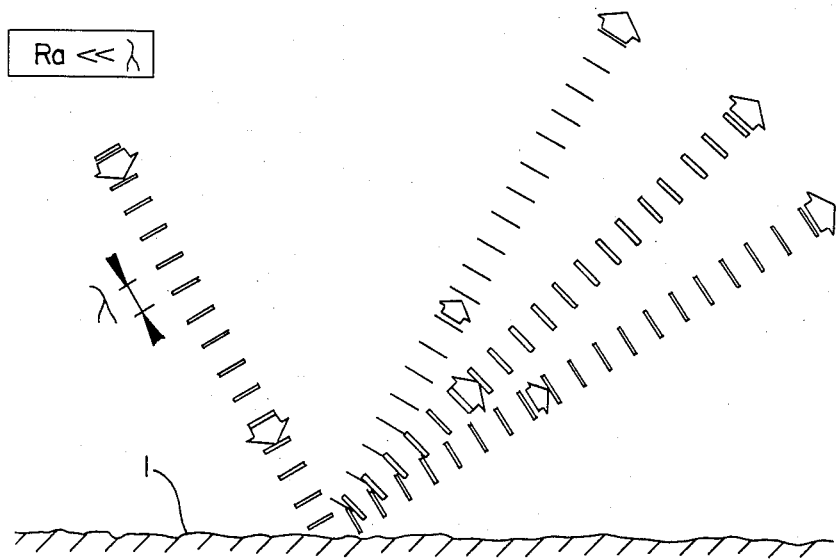
FIG. 2

CONTINUOUS MEASUREMENT OF THE SURFACE ROUGHNESS OF A COLD-ROLLED PRODUCT

BACKGROUND TO THE INVENTION

1. Field of Invention

The invention relates to a continuous measurement process for the surface roughness of a cold-rolled product, more particularly cold-rolled strip.

2. Description of Prior Art

The roughness of cold-rolled strip has, of course, a considerable effect on its cold-working properties and its appearance after painting. Cold-rolled strip should therefore have a surface roughness which is as constant as possible throughout; also, strips to be used for the same purpose should all be of comparable roughness. It is therefore important to monitor the roughness of strip produced in a cold-rolling mill to ensure very rapid detection of any deviation from permitted values.

Conventional monitoring takes the form of periodic sampling and laboratory testing of a strip sample. This method has the disadvantage of being discontinuous and of requiring rolling to stop for the sample to be taken by cutting the strip. Also, this kind of examination cannot help to determine the state of the entire strip. Furthermore, since the sample is taken in the inoperative state, since the strip has to be stopped, it is not always representative of the roughness produced in the operative state.

Of the possible methods of continuously determining the roughness of the surface of a rolled product such as cold-rolled strip, only the optical method is at present used. In the optical method a beam of visible light is transmitted on to the surface at a predetermined angle of incidence to the normal to the surface at the position of beam incidence, the beam reflected by the surfaces is collected, the reflected light energy is measured, and a measurement of surface roughness is deduced.

SUMMARY OF THE INVENTION

We have found that when surface roughness is of a similar order of magnitude to or greater than the wavelength of the light beam, the known method only provides information on the slopes of the profile—i.e. of the peaks and troughs—but cannot provide an accurate measurement of the real height of the peaks and troughs. Accordingly, the present invention provides a continuous measurement process for the surface roughness of a cold-rolled product, comprising transmitting a light beam onto the product surface, collecting the beam reflected thereby, measuring the reflected light energy, and deducing a measurement of surface roughness, in which a light beam of a wavelength at least equal to the maximum roughness of the surface is used.

The point is that there are various ways of determining the order of magnitude of the roughness of different cold-rolled products. For example, sheets which will subsequently be used in the fabrication of tinplate usually have a roughness of less than 0.6 $\mu$m whereas the roughness of strips for cold working usually varies between 1 and 3 $\mu$m.

In the case of cold-rolled strip for cold-working, a light beam whose wavelength is at least 5 $\mu$m is preferably used.

In one particular embodiment, a laser beam, preferably of a $CO_2$ laser, is used.

A lower-power laser beam of preferably less than 25 W may be used, in order not to damage the surface.

Advantageously, the incident laser beam is at an inclination of approximately 50° to the normal to the surface.

In a useful embodiment of the process according to the invention, the roughness of a moving strip is measured continuously by means of a light beam transmitter and receiver disposed on the path of the strip.

It has been found very advantageous in this connection to continuously measure the roughness of a strip at its exit from the skin-pass mill by means of a measuring system comprising a $CO_2$ laser of a power of 4 W and a pyroelectric cell collecting the laser beam specularly reflected by the strip surface. The measuring system was disposed immediately at the mill exit so that the incident and reflected beams defined a vertical plane perpendicular to the direction of strip movement. The angle of incidence was approximately 50°.

In another very interesting embodiment of the process according to the invention, a light beam of a wavelength at least equal to the maximum roughness of the product surface is transmitted on to the said surface, the beam is periodically interrupted, during the uninterrupted part of the transmission the light beam is transmitted directly on to the product surface at a first angle of incidence $\alpha_1$, during the interrupted part of the period the beam is deflected and is transmitted indirectly to the product surface at a second angle of incidence $\alpha_2$, the reflected beams corresponding to the direct and indirect incident beams are collected, the light energy of the reflected beams is measured, and a measurement of surface roughness is deduced.

In this procedure the use of the measurements of the light energy reflected at two different angles helps to reduce the effect of power fluctuations of the beam-emitting source and of varying absorptions of the light radiation by the product surface.

The invention will be described further, by way of example, with reference to the accompanying drawings.

BRIEF DESCRIPTION OF THE DRAWINGS

FIGS. 1(a) and 1(b) illustrates the light reflection associated with a wavelength, $\lambda$, less than the surface roughness, Ra;

FIG. 2 illustrates the diffraction of the light when the wavelength, $\lambda$, is greater than the surface roughness, Ra;

DETAILED DESCRIPTION

FIGS. 1(a) and 1(b) illustrates the reflection of light by a surface when the light wavelength, $\lambda$, is near to or less than the surface roughness, Ra. The surface can be considered as consisting of a large number of small mirrors of random shape, size, and orientation as depicted in FIG. 1(b). Consequently, measurement of the reflected radiation gives information about the slope of the roughness profile but not on the amplitude thereof and so does not provide any measurement of roughness.

FIG. 2 shows how light is diffracted by a surface when the light wavelength, $\lambda$, is greater than the surface roughness, Ra. The point is that in this case the surface roughness behaves like a random diffraction network leading to an angular distribution of the reflected light intensity. The angular distribution depends upon the amplitude of the roughness and this dependence can be determined experimentally by appropriate calibration of the device used to measure the reflected light intensity.

Figure 3:
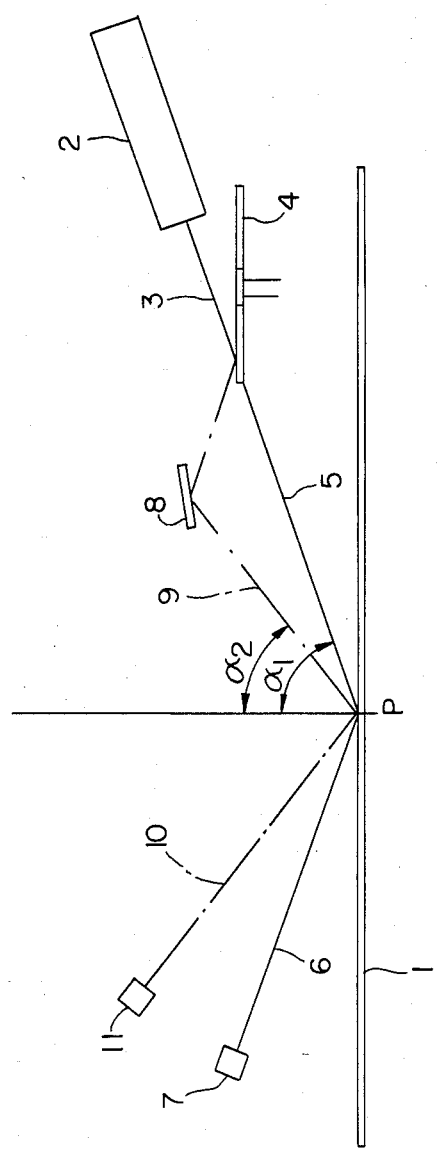
FIG. 3 is a diagrammatic view of a device for a very interesting embodiment using partial deflection of the incident beam.

FIG. 3 diagrammatically illustrates a device for a particularly interesting embodiment of the process according to the invention. It is required to measure the roughness of a steel strip 1. A $CO_2$ laser source 2 emits a continuous laser beam 3 towards the strip 1. The beam 3 is periodically interrupted by a perforated disc 4 rotating at a high speed. The disc is pierced with a number of windows separated by opaque zones, the windows and the opaque zones being disposed in consecutive and alternate relationship in a ring near the disc outer edge. When the disc 4 rotates the beam 1 is alternately transmitted through a window, then interrupted by an opaque zone. The directly transmitted beam 5 strikes the strip surface at a position p at a first angle of incidence $\alpha_1$ and the corresponding reflected beam 6 is received by a first pyroelectric cell 7, which measures its intensity $I_1$. The opaque zones of the disc 4 are reflecting surfaces so that the beam when interrupted by any opaque zone is deflected to a mirror 8 which reflects it as a beam 9 to the surface position P at a second angle of incidence $\alpha_2$. The corresponding reflected beam 10 is received by a second pyroelectric cell 11, which measures its intensity $I_2$. Preferably, the two pyroelectric cells are disposed in the direction of specular reflection of the respective incident beams; to this end, their position can be controlled by variations in strip inclination.

The measurement of surface roughness of the strip is based on the following principle:

The light intensity I reflected specularly at an angle $\alpha$ to the normal to the surface is given by the formula:

$$I = I_o \cdot \exp(-K \cdot \cos^2 \alpha \cdot Ra^2) \quad (1)$$

in which
 $I_o$ denotes the intensity reflected by a zero-roughness completely smooth surface,
 Ra denotes surface roughness, and
 K denotes a constant which depends upon the measurement units.

The intensity $I_o$ can be affected by fluctuations of different factors such as the power of the light source, the extent of radiation absorption by the surface, and the angle of incidence or sensitivity of the cell. To allow for these factors the value $I_o$ is considered to consist of an average stable component $I_m$ and a variable component $\epsilon$ which is usually small.

Therefore:

$$I_o = I_m + \epsilon.$$

In the present case formula (1) applied to the two directly and indirectly transmitted beams can be stated for the respective beams as follows:

$$I_1 = (I_{m1} + \epsilon_1) \cdot \exp(-K \cdot \cos^2 \alpha_1 \cdot Ra^2) \quad (2)$$

$$I_2 = (I_{m2} + \epsilon_2) \cdot \exp(-K \cdot \cos^2 \alpha_2 \cdot Ra^2) \quad (3)$$

To minimize measurement fluctuations:

$$((\epsilon_1)^2/I_{m1}) + ((\epsilon_2)^2/I_{m2}) \quad (4)$$

must be very small.

In these formulae $I_1$ and $I_2$ denote the measured intensities, whereas $I_{m1}$ and $I_{m2}$ are determined for a given system by a few calibration tests.

Formulae (2), (3), and (4) are therefore a means of determining the arithmetical mean roughness Ra of the strip surface.

EXAMPLE

The system hereinbefore described was used to measure the roughness of cold-rolled steel strips. In a previous mechanical measurement with an 8 mm cut-off—i.e., by eliminating surface profile variations of a wavelength greater than 8 mm—the strips had a roughness between 0.8 and 4 micrometers. 30 samples were tested in the following conditions:
 Power of $CO_2$ laser: 6 W
 Distance between the laser and the place of impact: 570 mm
 Distance between the place of impact and the cells: 570 mm
 Angle of incidence $\alpha_1 = 65°$
 Angle of incidence $\alpha_2 = 50°$
 Linear speed of strip: 65 m/min.

Figure 4:
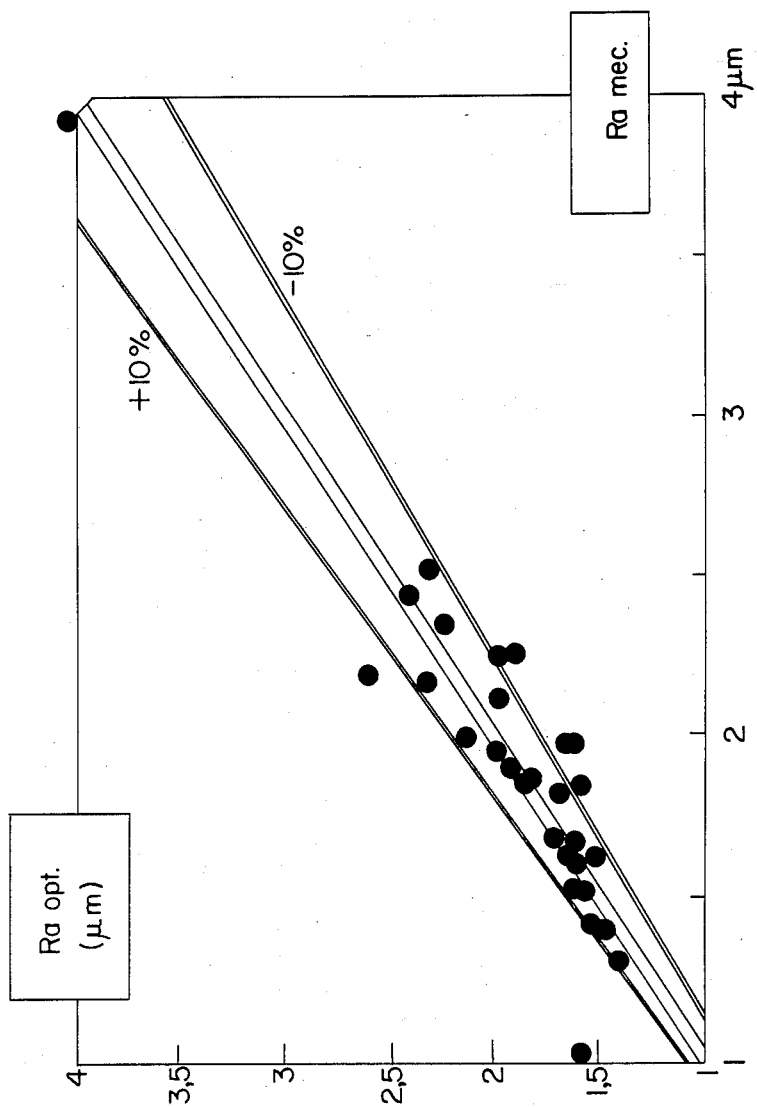
FIG. 4 shows the correlation between the roughness results obtained by optical measurement according to the invention and the results obtained by a conventional mechanical measurement.

FIG. 4 collates the results and shows the correlation between the result of the optical measurements in accordance with the invention (Ra opt) along the ordinate and the result of conventional mechanical measurements (Ra mec) along the abscissa, the measurements being made with an 8 mm cut-off as previously explained. The correlation is clearly excellent, the maximum deviation being $\pm 10\%$, which is quite adequate in view of the inaccuracy of the mechanical measurement.

The invention is not of course limited just to the embodiments hereinbefore described and illustrated.

More particularly, the invention would cover the use of two separate light beams instead of a single beam broken up as hereinbefore described. This feature would not necessarily be advantageous for it would call for the use of dual equipment and might inter alia cause serious interference problems.

Also, an appropriate device could be provided to reduce the divergence of the light beam, more particularly of the laser beam, when there is a long distance between the transmitter and the surface.

Nor is the invention linked with any particular orientation of the vertical plane formed by the incident and reflected beams relatively to the direction of movement of the surface.

Also, and still in accordance with the invention, the roughness can be measured continuously and simultaneously at a number of points distributed over product width by means of a number of measurement systems corresponding to these various aiming points. This procedure helps to determine the distribution of roughness over the width of the rolled product, for example, of a cold-rolled strip.

The process according to the invention helps to monitor the longitudinal roughness trend of a cold-rolled strip and to immediately detect the time when the roll needs changing. The process according to the invention helps to obviate long downtimes of the rolling mill and product losses.

We claim:

1. A method for continuously optically measuring the surface roughness of a cold-rolled product, comprising:
   determining permitted surface roughness values for said product;
   transmitting an incident light beam having a wavelength at least equal to a maximum value of said permitted surface roughness values onto said product surface;
   receiving a light beam reflected from said product surface;
   measuring the light intensity of said received reflected light beam;
   determining from said measured light intensity a measured value of surface roughness of the product; and
   comparing said measured value of surface roughness with said permitted surface roughness values.

2. The process of claim 1, further comprising the steps of interrupting the incident light beam periodically; transmitting the uninterrupted part of the incident light beam directly onto the product surface at a first angle of incidence $\alpha_1$; deflecting the interrupted part of the beam and transmitting it indirectly to the same position of the product surface at a second angle of incidence $\alpha_2$; collecting reflected beams corresponding to the direct and indirect incident beams; measuring the light energy of the reflected beams; and deducing therefrom a measurement of surface roughness.

3. The process of claim 1, in which the said product is cold-rolled strip for cold working and the wavelength of the light beam is at least 5 $\mu$m.

4. The process of claim 1, in which the light beam is a laser beam.

5. The process of claim 4, in which the laser beam is produced by a $CO_2$ laser.

6. The process of claim 4, in which the laser beam has a power of less than 25 W.

7. The process of claim 1, in which the incident beam is at an inclination of approximately 50° to the normal to the product surface.

8. The process of claim 1, in which the light energy reflected in the specular direction is collected.

9. The process of claim 1, in which the roughness is measured at a number of places over the width of the product.

10. The method according to claim 1, wherein said permitted values of surface roughness are in the range of 1 to 3 um for cold-rolled strip products for deep drawing and less than 0.6 um for cold-rolled black plates for tin plate fabrication.

11. The method according to claim 1, wherein said permitted surface roughness values are determined mechanically.

12. The method of claim 1, further comprising:
   monitoring the trend of the measured surface roughness along a longitudinal direction of a cold-rolled strip product;
   detecting when a deviation resulting from said comparison of said measured and permitted roughness values exceeds a predetermined value, and
   determining from said detected deviation when a roll of said product needs to be changed.

* * * * *